United States Patent [19]
Dupuie et al.

[11] Patent Number: 6,035,694
[45] Date of Patent: Mar. 14, 2000

[54] METHOD AND APPARATUS FOR CALIBRATION OF STRAY CAPACITANCE MISMATCH IN A CLOSED LOOP ELECTROMECHANICAL ACCELEROMETER

[75] Inventors: Scott T. Dupuie; Richard A. Johnson, both of Buda; Ben W. Jones, Austin; Mauricio A. Zavaleta, Austin; Mark E. Burchfield, Austin; Burton A. Devolk, Cedar Park; Franklin W. Mayo, Houston; Michael L. Abrams, Houston, all of Tex.; Roger Maher, Terenure, Ireland

[73] Assignee: I/O of Austin, Inc., Austin, Tex.

[21] Appl. No.: 09/268,072

[22] Filed: Mar. 12, 1999

[51] Int. Cl.$^7$ .................................................. G01P 15/00
[52] U.S. Cl. .................................................. 73/1.38
[58] Field of Search .................. 73/1.15, 1.37, 73/1.38, 514.18, 514.32, 724, 654, 780, 862.626

[56] References Cited

U.S. PATENT DOCUMENTS

| | | | |
|---|---|---|---|
| 4,381,677 | 5/1983 | Ruesch et al. | 73/724 |
| 5,237,285 | 8/1993 | Lofgren et al. | 73/708 |
| 5,600,066 | 2/1997 | Torregrosa | 73/514.18 |
| 5,652,384 | 7/1997 | Henrion et al. | 73/514.18 |

OTHER PUBLICATIONS

Rick West, Automatic Calibration of Strain Gauges, Sensor Solutions, SENSORS Jul. 1995 pp. 44,46.

*Primary Examiner*—Robert Raevis
*Attorney, Agent, or Firm*—Gary L. Bush; Mayor, Day, Caldwell, & Keeton, L.L.P.

[57] ABSTRACT

A method and apparatus for measuring and compensating for stray capacitance of a micro-machined sensor of an accelerometer system is disclosed. Stray capacitance differences between a top plate and a sensing element and between a bottom plate and the sensing element degrade accelerometer performance if not compensated for. Measurement of stray capacitance difference is achieved by operating the accelerometer in two calibration phases and measuring the steady-state output voltage in each of the two phases. In calibration phase 1, no force is applied to the sensor during clock intervals 1–4. In calibration phase 2, a dummy force up is applied and then a dummy force down is applied during those intervals 1–4. The difference in the output voltage of the two calibration phases is representative of the difference in stray capacitance of the sensor. Capacitance is added to the top or bottom plates in an amount proportional to the measured stray capacitance. The procedure is repeated until the voltage difference of the two calibration phases is zeroed, which is indicative that the inherent stray capacitance has been zeroed.

12 Claims, 11 Drawing Sheets

DD=DUMMY FORCE DOWN
DU=DUMMY FORCE UP
GC=GRAVITY CANCELLATION
EQ=EQUALIZE
PS=POSITION SENSING

METHOD AND APPARATUS FOR CALIBRATION OF STRAY CAPACITANCE MISMATCH IN A CLOSED LOOP ELECTRO-MECHANICAL ACCELEROMETER

BACKGROUND OF THE INVENTION

1. Field of the Invention

This invention relates generally to the field of automatic calibration of sensors in a closed loop transducer system. More particularly, the invention relates to the calibration for stray capacitances of a capacitive-sensing sensor in an electrostatic force-rebalancing accelerometer. Still more particularly, the invention relates to a sensor with top and bottom plates facing a centered mass supported by springs from a support frame and an electronic force-rebalancing system coupled to the sensor and to a method and apparatus for balancing mismatch in stray capacitance between the mass and the top and bottom plates.

2. Description of the Prior Art

FIGS. 1 and 2 illustrate a capacitive sensor shown generally at 10. FIG. 1 shows the sensor in a partially cut-away perspective view. FIG. 2 shows a plan view of the mass-spring-support frame assembly. The sensor includes a body including a top cover (or cap) 12, a bottom cover (or cap) 14, and a central (or seismic) mass 16 supported by springs 32, 34 from a generally rectangular frame 18 which receives the central mass 16 therein between cover plates 12 and 14. Sensor assembly 10 is preferably machined from wafers of a non-metallic monocrystalline material such as silicon, germanium, quartz, gallium arsenide, gallium phosphate, etc.

A spring support structure or connecting arrangement to support mass 16 from outer frame 18 is provided in a cavity between mass 16 and frame 18 and includes four top L-shaped spring members 32 and four bottom L-shaped springs 34. The preferred embodiment of the sensor 10 is described in U.S. Pat. No. 5,652,384 issued to I/O Sensors and in pending U.S. application Ser. No. 08/516,501 (assigned to I/O Sensors), both such patent and application incorporated by reference herein.

FIG. 3 is a cross section illustration of the sensor of FIGS. 1 and 2. When a force acts in a perpendicular direction to conductive surfaces 52, 52 of mass 16, top and bottom springs 32, 34 are deflected upwardly or downwardly relative to the illustration of FIG. 3. For a small deflection, springs 32, 34 are deformed linearly with input force applied perpendicularly to the top and bottom surfaces of mass 16. Such linear movement of the springs enables an extremely accurate measurement of a variable related to input force by measuring the displacement of mass 16 from the rest position. Such variable is preferably acceleration where forces are constant or dynamic of a frequency below the natural frequency of the sensor structure.

The sensor 10 of FIG. 3 is schematically shown in FIG. 4 to demonstrate and illustrate the operation of a capacitive sensor and electrostatic force feedback system for the measurement of acceleration. The sensor 10 is combined with analog and digital electronic circuits to sense the position of mass 16 between conductive plates 50 of top and bottom covers 12, 14. Electrostatic force feedback is provided by the feedback circuits to return mass 16 to an equilibrium position between plates 12.

The accelerometer system of FIG. 4 is placed in several states by a micro-computer based switch controller 100 which controls the opening and closing of various switches $S_1$–$S_{13}$. The switch controller operates at a clock frequency of 128 KHz. A repetitive cycle which includes 32 states is produced by controller 100. FIG. 5 illustrates the opening and closing of switches $S_1$–$S_{13}$ for each cycle. Each cycle starts with the end of the forcing period and begins with the first of several sensing phases. Each cycle includes three phases: Sensing Phase, Sample Phase, and Forcing Phase. A description of each state of the arrangement of FIG. 4 under control of switch controller 100 follows.

State 0: Sensing Phase: Voltage Equalization

During State 0 Switch S5 is opened thereby disconnecting the forcing voltage $V_F$ from center pin or lead 96 from the conductive regions 52 of mass 16. Very shortly thereafter, switch S9 is closed which rapidly discharges charge on the conductive regions 52 and brings them to ground or zero volts. The reference voltages +$V_R$ and -$V_R$ are applied to conductive regions 50 of the sensor top and bottom plates 12, 14 respectively, because switches S1 and S3 are closed.

State 1: Sensing Phase: Charge Summation

Next, Switch S9 opens and very shortly thereafter, switch S6 closes thereby connecting the sensor center pin 96 to the inverting input of operational amplifier (op amp) OA1. Because switches S7 and S8 are closed during this time, the inverting input of OA1 is forced to the offset voltage of the operational amplifier which is typically less than 100 micro volts ($\mu$V) in absolute value.

State 2: Sensing Phase: Charge Transfer

Next switches S7 and S8 open, leaving only capacitor $C_1$ in the feedback path of op amp OA1 in preparation for the charge transfer from the sensor 10. In addition, the charge injected from switch S7 onto capacitor $C_1$ is balanced by the charge injected via switch S8 onto $C_2$ thereby providing first order cancellation of the parasitic effect at the output of op amp OA1.

State 3: Sensing Phase: Sense Position of Mass 16 Between Top and Bottom Plates 50

Next, charge is transferred from the sensor 10 to the op amp OA1 by opening switches S1 and S3 and very shortly after closing switches S2 and S4. As a result, a voltage change of $V_R$ occurs on the sensor top conducting plate 50 and -$V_R$ on the bottom conducting plate 50 both with respect to the sensor center lead 96 which remains at the offset of the sense op amp OA1 plus the charge injection pedestal of S8-$C_2$ after a short transient.

Therefore charge $\Delta Q=Q_1+Q_2$ is transferred to the sensor center lead 96 where $Q_1=V_R C_T$ and $Q_2=-V_R C_B$, where $C_T$ represents the capacitance between the top conducting plate 50 and the top of mass 16 plate 52, and $C_B$ represents the capacitance between the bottom plate 50 and the bottom of mass 16 plate 52. As a result, charge of amount $\Delta Q=V_R(C_T-C_B)$ is transferred onto the feedback capacitor $C_1$.

At the end of state 3, the op amp OA1 output on lead 97 settles to the voltage value, $$\frac{-\Delta Q}{C_1} = \frac{-V_R(C_T - C_B)}{C_1}$$

Because, $$C_T = \frac{\epsilon_o A}{d - x},$$

and $$C_B = \frac{\epsilon_o A}{d + x}, \text{ where}$$

$\epsilon_0$=dielectric constant,
A=area of conducting plates
d=distance between top and bottom plates 50, and x=distance that mass 16 has moved from the center position between top and bottom plates, $$(C_T - C_B) = \left(\frac{\epsilon_0 A}{d} \frac{2x/d}{1-(x/d)^2}\right)$$

As a result, the sense voltage on lead 97 can be approximated as a linear function of displacement x from a center position for |x|<<d, which applies under normal operating conditions.

State 4: Sample Phase

During state 4, the sample/hold circuit arrangement 99 including op amp OA2 and switches S10, S11, S12, S13 acquires the voltage $$\frac{+V_R(C_T - C_B)}{C_1}$$

at its output 98 by going into the sample mode with S10 and S12 open and S11 and S13 closed. After settling for one state time, such switches change back into the hold mode by opening switches S10 and S12 and closing switches S11 and S13. Very shortly thereafter, the hold mode is entered during which forcing of mass 16 to its center position is performed.

States 5–31: Forcing Phase

In the forcing phase, voltage $V_F$ is applied to the sensor conductive areas 52 via lead 96. Simultaneously, the voltage $+V_R$ is applied to the top plate 50 and voltage $-V_R$ is applied to the bottom plate 50. The sense op amp OA1 is disconnected from the sensor 10 while the sample/hold circuit 99 holds at its output lead 98 the last sampled value of voltage representative of the sensor position. The cycle is repeated at the overall system sample rate.

The description of the operation of FIG. 4 assumes that there are no stray capacitances between the conductive plate 50 of top cover 12 and conductive region 52 of mass 16 which defines the "top" capacitance $C_T$ and between the conductive plate 50 of bottom cover 14 and bottom conductive region 52 of mass 16 which defines the "bottom" capacitance $C_B$.

In actual fabrication of the sensor of FIG. 3, the top and bottom conductive regions 52, 52 of mass 16 may not be in precise registration with the top and bottom conductive regions 50 of top and bottom plates 12, 14. For example, the mass 16 may have a fixed tilt (that is, it is rotated about the mass center) with respect to the parallel top and bottom plates 12, 14. Or, the mass 16 might be level, but the top or bottom plate 12, 14 may tilt with respect to the proof mass 16. Or, either the top or bottom plate 12, 14 may be bowed up (concave up) or bowed down (concave down). In each case, the stray capacitance from the mass top surface 52 to the cover top surface 50 is different from the stray capacitance from the mass bottom surface 52 to the bottom cover surface 50. It can be shown that the system of FIG. 4 has its signal to noise ratio degraded due to stray capacitance mismatch.

Identification of Objects of the Invention

A primary object of this invention is to provide a method and circuit arrangement for automatic calibration of the accelerometer system of FIG. 4 for stray capacitance differences between the mass and the top plate and the mass and the bottom plate.

An important objective of the invention is to minimize unbalanced stray capacitance in order to maximize the signal to noise ratio of the system.

Another objective of the invention is to provide neutralization of stray capacitance on each side of the sensor with a stray capacitor array on the accelerometer ASIC.

SUMMARY OF THE INVENTION

An Application Specific Integrated Circuit or "ASIC" is provided for automatic calibration of a capacitive sensor in an electrostatic force-rebalancing accelerometer system. The ASIC includes a startup sequencer which calibrates the sensor for stray capacitance between a mass element and conductive plates which face the mass element. The ASIC incorporates the method of the invention including the steps of pulling the sensor off a stop during start up, calibrating the sensor at 0.1 g full-scale with no dummy force applied, calibrating the sensor at 0.1 g full scale with dummy force applied and finally turning on the $\Delta\Sigma$ modulator of the ADAC of the system.

Stray capacitance calibration is achieved with apparatus and methods for first determining the value of a parameter which is representative of how much stray capacitance to add to the sensor to neutralize existing stray capacitance and then providing an apparatus and method for adding controlled amount of capacitance to the top and bottom plates of the sensor.

BRIEF DESCRIPTION OF THE DRAWINGS

The objects, advantages, and features of the invention will become more apparent by reference to the drawings which are appended hereto and wherein like numerals indicate like parts and wherein an illustrative embodiment of the invention is shown, of which.

DESCRIPTION OF THE INVENTION

Figure 4:
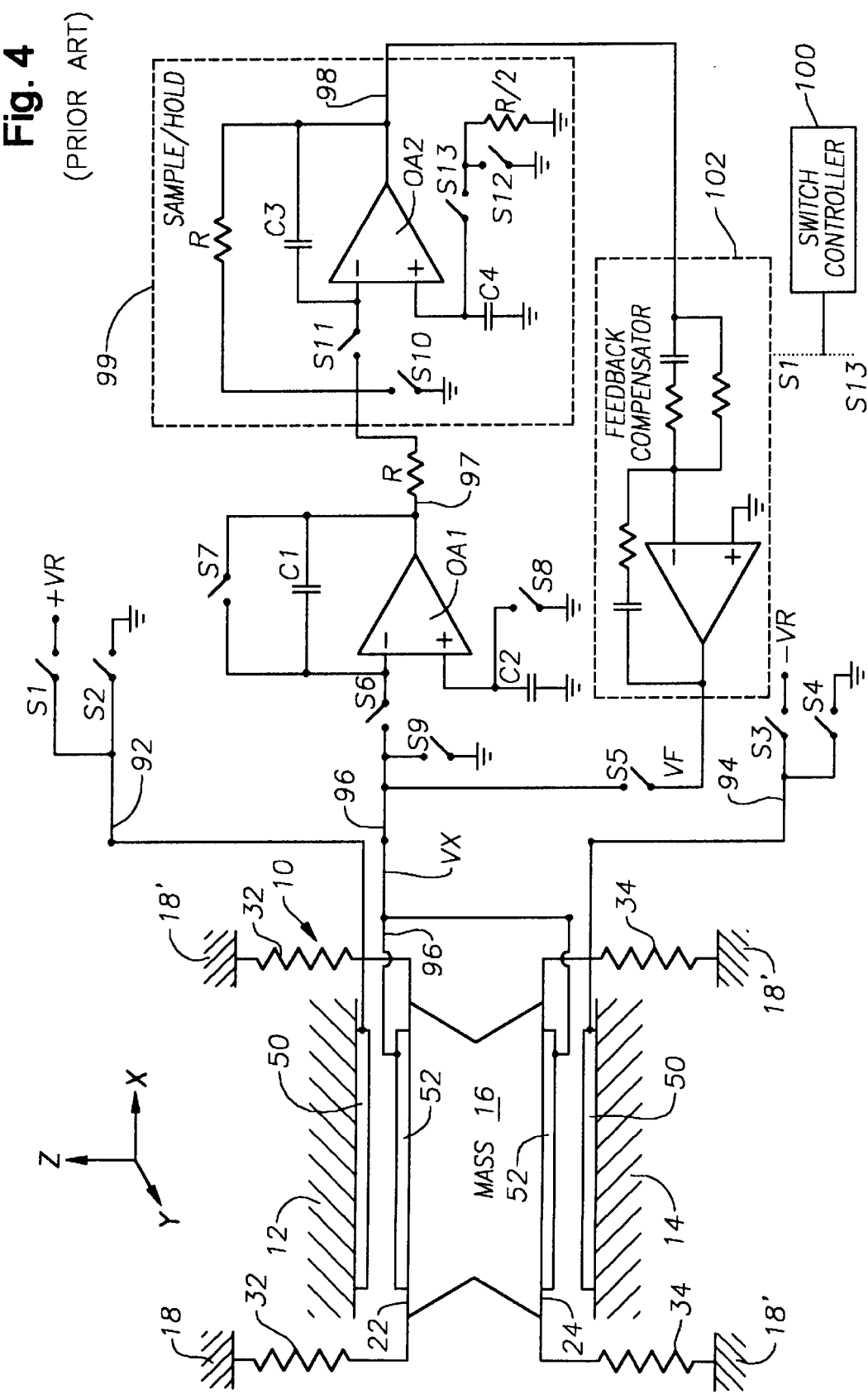
FIG. 4 is a schematic illustration of a prior art accelerometer system including a capacitive sensor and an electronic force rebalancing system for cyclically sensing the position of the mass element of the sensor and with a feedback system which applies an electrostatic force to the mass element to cause the mass element to be at an equilibrium position.
Figure 5:
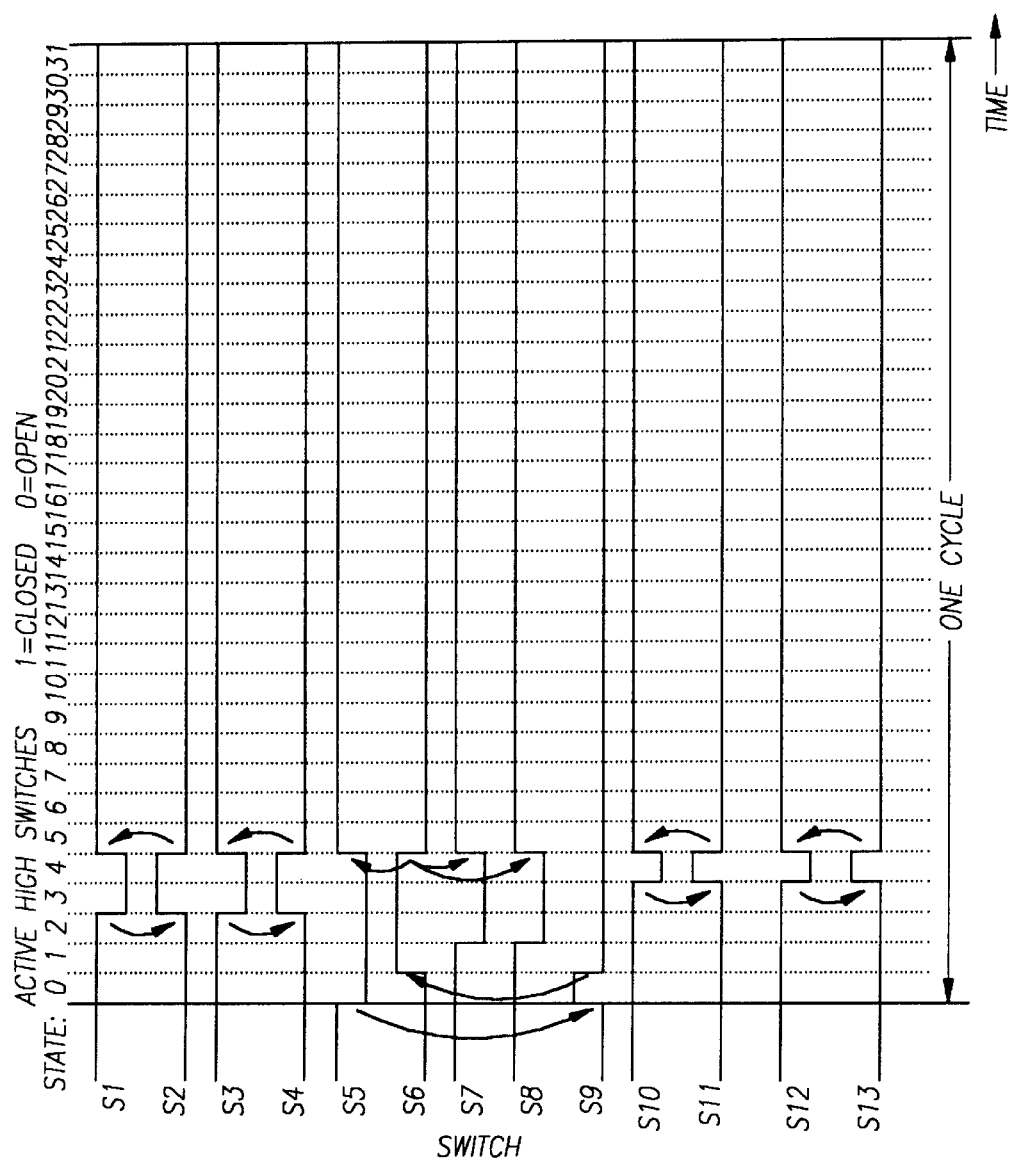
FIG. 5 is a switch sequencing diagram for the control of switches in the prior art accelerometer of FIG. 4.
Figure 6:
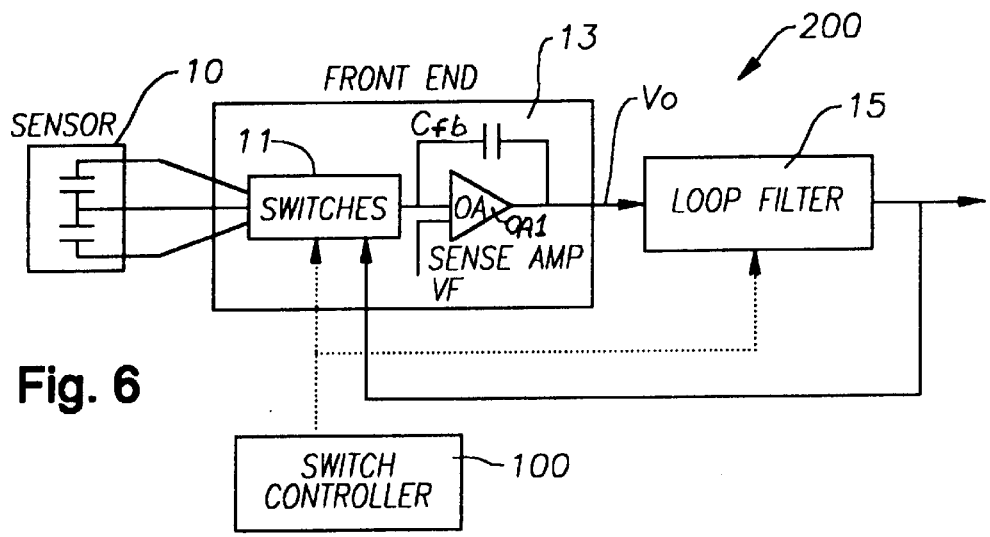
FIG. 6 is a simplified schematic diagram of the closed-loop accelerometer in which automatic calibration of stray capacitance of the sensor is performed according to this invention.

A simplified block diagram of the closed-loop accelerometer 200 of FIGS. 4 and 5 is shown in FIG. 6. The basic components are A micromachined mass spring system referred to as the sensor 10;

An analog circuit which interfaces to the sensor 10 and switches 11 (e.g., switches S1 . . . S13 of FIG. 4) and provides both electrostatic forcing and mass position sensing referred to as the front end 13;

An analog, switched capacitor loop filter 15 providing compensation and noise shaping for the feedback loop; and A digital switch controller circuit 100 providing clock signals used for controlling switches in the front end 13 and the loop filter 15.

In operation, the feedback loop electrostatically forces the sensor 10 in a way which compensates for an external acceleration on the sensor. During stray capacitance calibration, the feedback signal (and output from the accelerometer 200) is a continuous forcing voltage proportional to the incident acceleration. During normal operation, the feedback consists of a ΣΔ modulated bitstream, i.e., a fixed amount of forcing occurs in either direction. Forcing and position sensing are time-division-multiplexed during each oversampling period via the front end switches 11 and the switch-controlling clock signals of switch controller 100 as described above.

Figure 1:
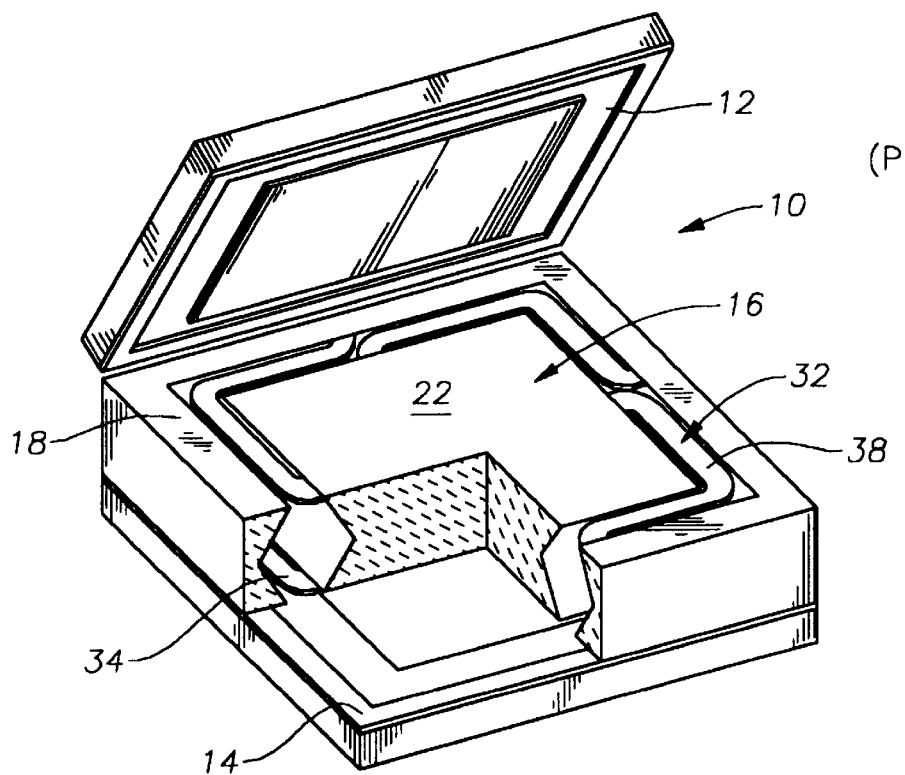
FIG. 1 is a perspective view of the prior art sensor of the accelerometer, with a sensing mass supported from a support frame by top and bottom L-shaped springs with a portion of the mass cut-away to show a lower cover, and with a top cover illustrated above its normal position.
Figure 2:
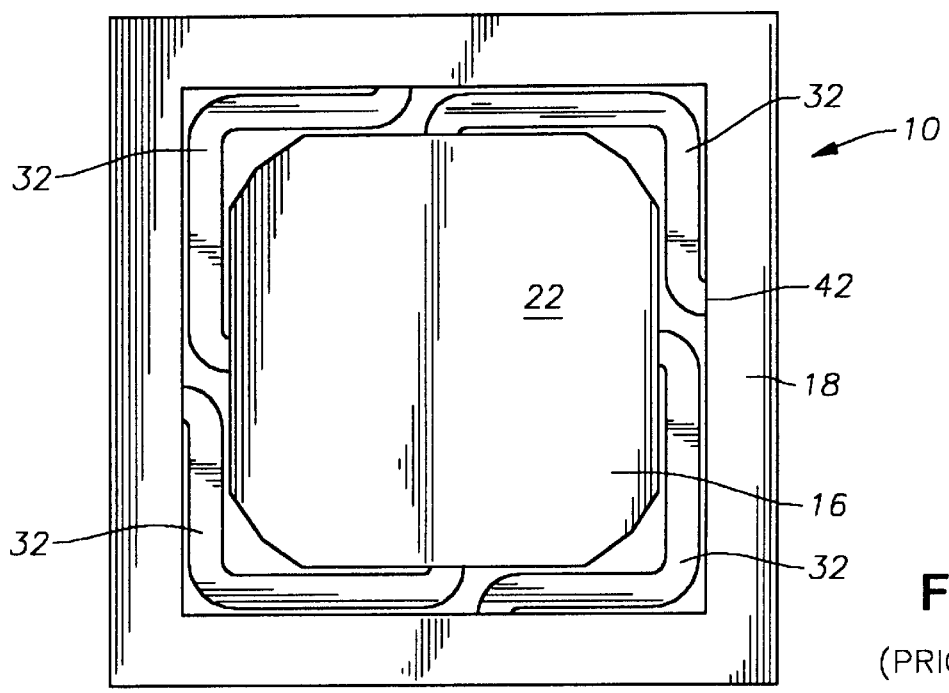
FIG. 2 is a plan view of the prior art sensor showing the mass and supporting frame and top springs between the mass and the supporting frame.
Figure 3:
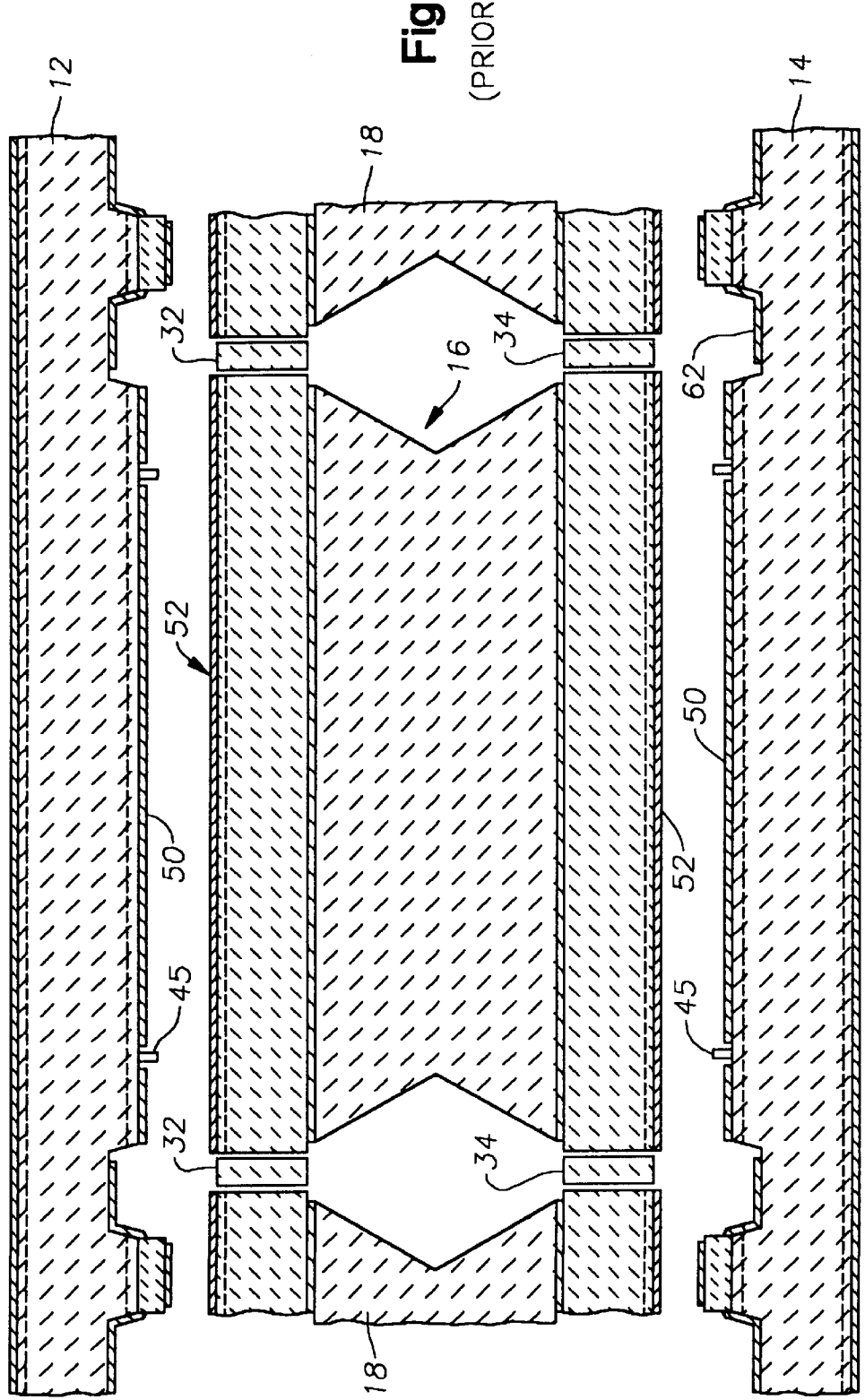
FIG. 3 is a cross section of the prior art sensor showing top and bottom cover plates which face the sensor and supporting frame.
Figure 7:
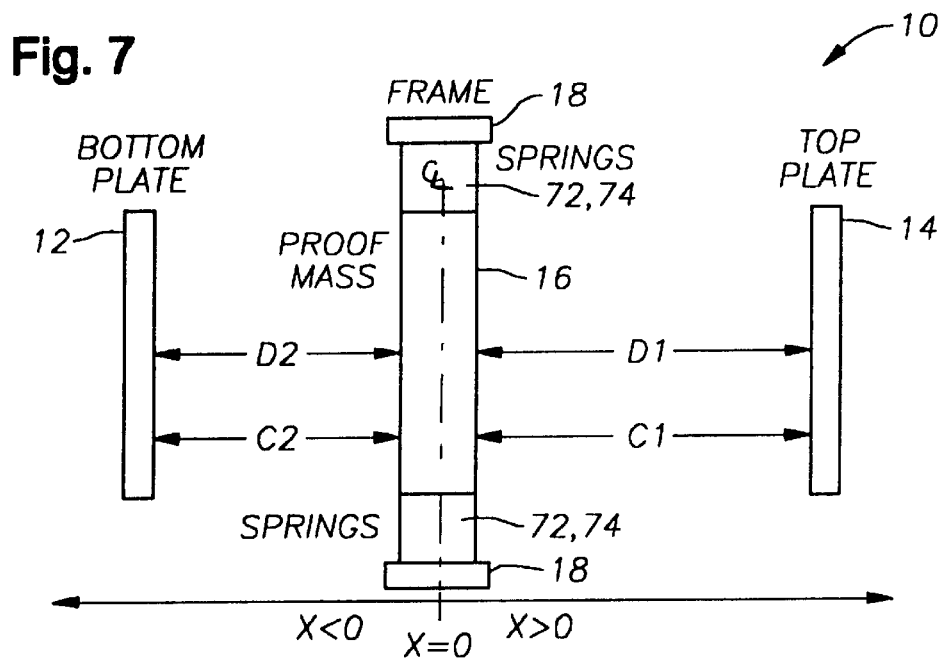
FIG. 7 is an illustration of a coordinate system for a capacitance feedback sensor used to explain the measurement of stray capacitance and compensation for it in this invention.

The sensor 10 is a silicon micromachined structure which includes a proof mass 16 (see FIGS. 1, 2, 4) suspended between two plates 12, 14. The basic structure of the sensor and the reference coordinate system are schematically illustrated in FIG. 7.

Figure 8:
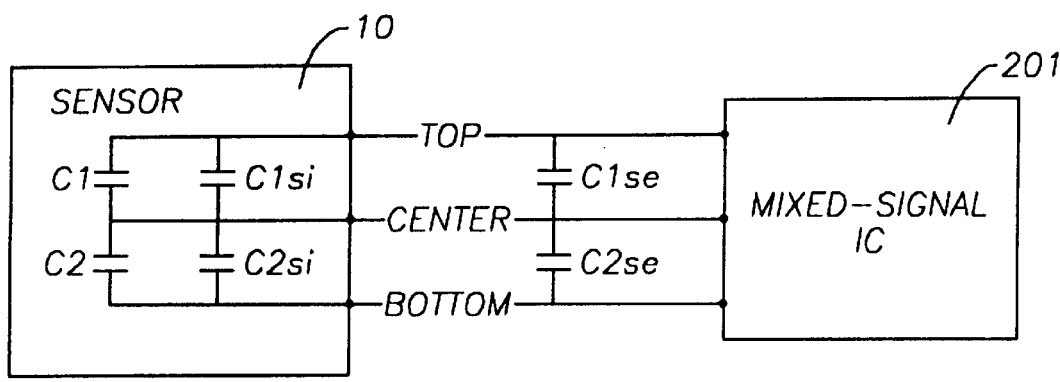
FIG. 8 is an electrical model of the accelerometer of this invention showing stray capacitance which is measured and compensated for by the method and apparatus of this invention.

An electrical model of the sensor is shown in FIG. 8. The plate capacitances are denoted C1 and C2 and are dependent on the position x of the proof mass 16 between the plates 12, 14. Two mechanisms are largely responsible for the stray capacitances:

(1) Process variations within or internal to the sensor package (metal widths, oxide thickness, bonding effects); and (2) External effects related to socketing, PC board layout, and packaging.

The internal stray capacitances are lumped together and denoted C1*si* and C2*si*. External stray capacitances are lumped together and denoted C1*se* and C2*se*. The electrical element 201 of FIG. 8 which is connected to the capacitance model represents all of the front end 13, loop filter 15, and switch controller 100 of FIG. 6.

Figure 9:
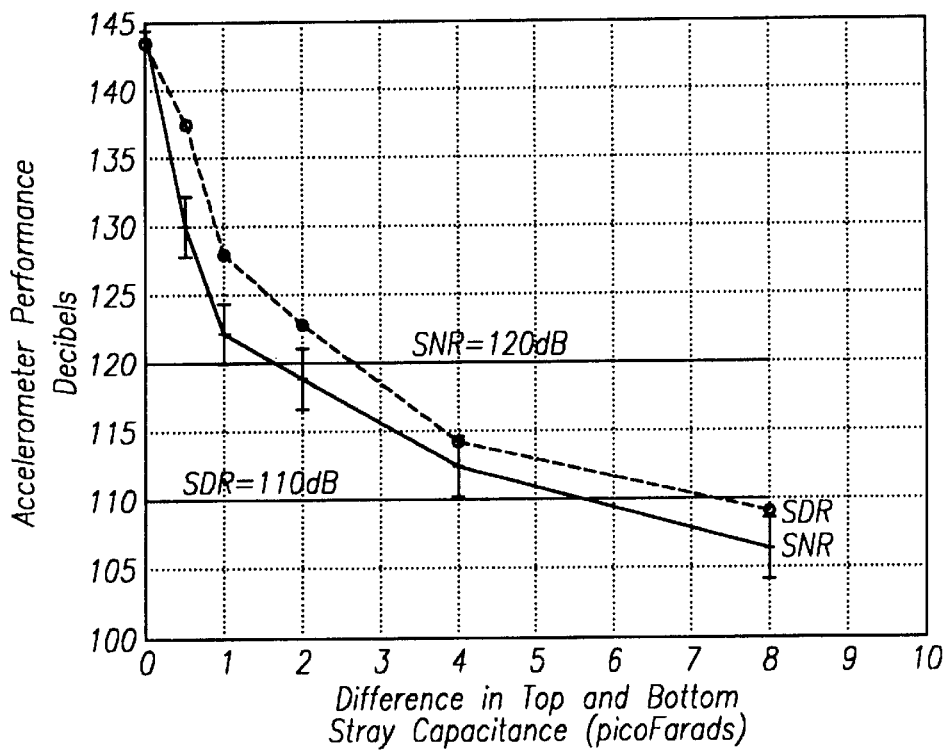
FIG. 9 is a graph which demonstrates degradation of accelerometer performance of SNR and SDR as a function of stray capacitance mismatch between top and bottom plates and a center seismic mass.

A mismatch in the total stray capacitances across the plates 12, 14 results in an offset in the mass position x away from the mechanical center. This offset degrades the performance of the accelerometer as illustrated in the graph of FIG. 9. A review of the graph of FIG. 9 indicates that some form of automatic matching or calibration of stray capacitance is necessary if optimum performance of the accelerometer 200 is desired.

A stray capacitance calibration procedure relies on the ability to (1) Provide a mechanism to add controlled amounts of capacitance to the top and bottom plates of the sensor, and (2) Identify a measurable quantity that can be used to determine how much stray capacitance to add.

The apparatus and method described herein uses an array of capacitors and a decoder which include a digital-to-analog converter (DAC) for capacitance. This apparatus is connected to the top, center, and bottom plates of the sensor. The parameters that are measured and used to decide how much capacitance to add or subtract are the steady-state feedback voltages in two special-purpose stray calibration phases. Such calibration phases are described below.

Figure 10:
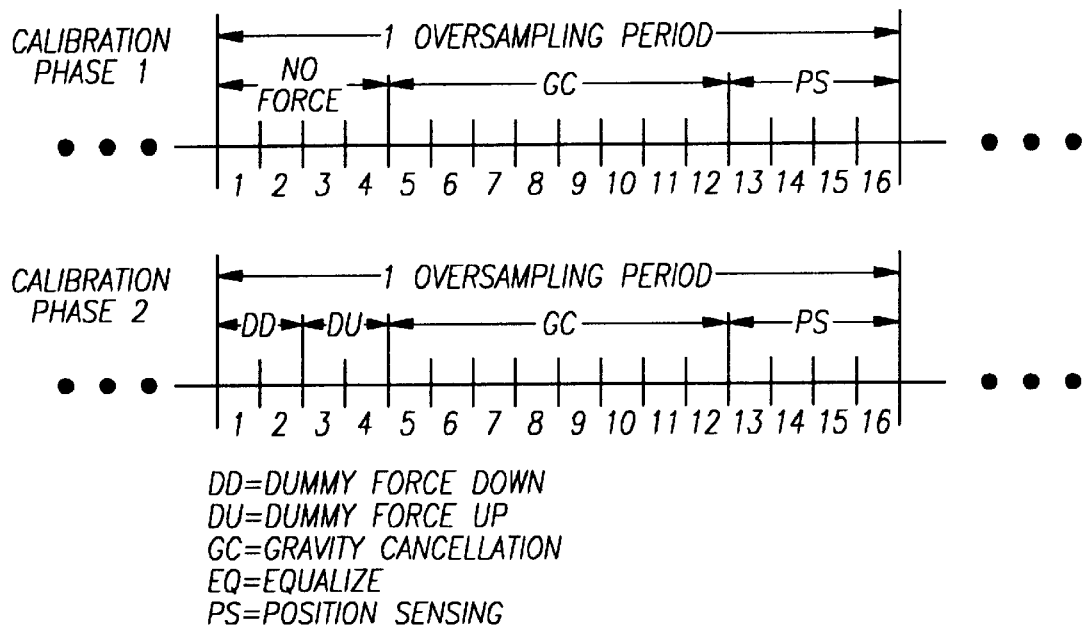
FIG. 10 illustrates two calibration phases used by the method of the invention for the automatic calibration of stray capacitance.

The time-division-multiplexed forcing and sensing for the two calibration phases is shown in FIG. 10 (one period of the oversampling clock). Each period of the oversampling clock includes a forcing interval and a position sensing interval. In calibration phase 1, there is no force applied to the sensor during clock intervals 1–4. During the next 8 intervals, (5–12) a force is applied to the sensor that is proportional to the feedback loop voltage. The remaining intervals are used to sense the position of the sensor's proof mass. Calibration phase two adds 2 intervals of a dummy force down and a dummy force up during which time a fixed voltage is applied to the sensor that is not dependent on the feedback loop voltage. The total forces on the sensor in calibration phase 1 and phase 2 are given below.

Phase 1:

$$mA_{EXT}=F_{GC}(x, V_{F1}, \ldots)+F_{PS}(x, \ldots) \qquad (1)$$

Phase 2:

$$mA_{EXT}=F_{DD}(x, \ldots)+F_{DU}(x, \ldots)+F_{GC}(x, V_{F2}, \ldots)+F_{PS}(x, \ldots) \qquad (2)$$

where m=sensor mass, $A_{EXT}$=the sum of all external (ambient) accelerations on the mass, $F_{GC}(\ldots)$=the force applied to the sensor during the gravity cancellation phase, $F_{PS}(\ldots)$=the force applied to the sensor during the position sensing phase, $F_{DD}(\ldots)$=the force applied during the dummy down phase, $F_{DU}(\ldots)$=the force applied during the dummy up phase, x=the position of the sensor mass, $V_{F1}$=the feedback voltage during calibration phase 1, $V_{F2}$=the feedback voltage during calibration phase 2.

Note that $F_{GC}(x, V_{F1}, \ldots)$ and $F_{GC}(x, V_{F2}, \ldots)$ are a function of both the position of the mass and the feedback voltage while $F_{DD}(x, \ldots)$ and $F_{DU}(x, \ldots)$ are not a function of the feedback voltage. The feedback loop will provide a forcing voltage to the sensor (during the gravity cancellation phase) that will result in zero net force (and hence zero acceleration) on the sensor. If $F_{DD}(x, \ldots)=F_{DU}(x, \ldots)$, then Equation (1) is the same as Equation (2), and the steady-state value of $V_{F1}$ will be equal to the steady-state value of $V_{F2}$. The only time that $F_{DD}(x, \ldots)=F_{DU}(x, \ldots)$ is when x is at the center position between the plates. This occurs only when the stray capacitance is balanced. Hence if $V_{F1}$ and $V_{F2}$ are equal, then the sensor's stray capacitance is balanced.

The method for calibrating the accelerometer of FIGS. 6, 7, 8 includes the sequential steps of:

(1) Let the loop reach steady-state in calibration phase 1;

(2) Convert the analog voltage $V_{F1}$ to a digital value and store it;

(3) Let the loop reach steady-state in calibration phase 2;

(4) Convert the analog voltage $V_{F2}$ to a digital value and store it;

(5) Compare the stored voltages $V_{F1}$ and $V_{F2}$;

(6) If the voltages are not the same, then add capacitance to the top or bottom plates;

(7) Go back to step (1) until $V_{F1}=V_{F2}$.

Theory Of Operation

Referring to FIGS. 7 and 8, the position-dependent plate capacitances are given by $$C1 = \frac{\varepsilon \cdot A}{d1 - x} \quad (3)$$

$$C2 = \frac{\varepsilon \cdot A}{d2 + x} \quad (4)$$

where $\varepsilon$=permittivity constant,

A=plate area of plates 12, 14, d1=gap between plate 14 and the center mass 16, d2=gap between plate 12 and the center mass 16, x=mass 16 position between plate 12 and plate 14.

The total capacitances at the terminals of the sensor, denoted C1t and C2t, are given by $$C1t = C1 + C1s + C1a \quad (5)$$

$$C2t = C2 + C2s + C2a \quad (6)$$

where C1s, C2s=total stray capacitance (internal and external) for top 14 and bottom 12 plates respectively, and C1a, C2a=adjustable capacitance (adjustable stray array).

The sense amplifier OA1 (FIG. 6) output voltage Vo is related to the difference in the total top and total bottom capacitances by $$V_0 = V_{ref} \cdot \frac{C1t - C2t}{Cfb} \quad (7)$$

where Cfb is the amplifier feedback capacitance. In operation, the feedback loop tries to drive the sense amplifier output voltage to 0 volts; therefore, $$C1t = C2t \quad (8)$$

or $$\left(\varepsilon \cdot \frac{A}{d1-x} + C1s + C1a\right) - \left(\frac{\varepsilon \cdot A}{d2+x} + C2s + C2a\right) = 0 \quad (9)$$

Using the linear part of the power series expansion of Equation 9 (good for x<<d) gives $$\left(\varepsilon \cdot \frac{A}{d1} - \varepsilon \cdot \frac{A}{d2} + C1s + C1a - C2a - C2s\right) + \left(\varepsilon \cdot \frac{A}{d2^2} + \varepsilon \cdot \frac{A}{d1^2}\right) \cdot x = 0 \quad (10)$$

Figure 11:
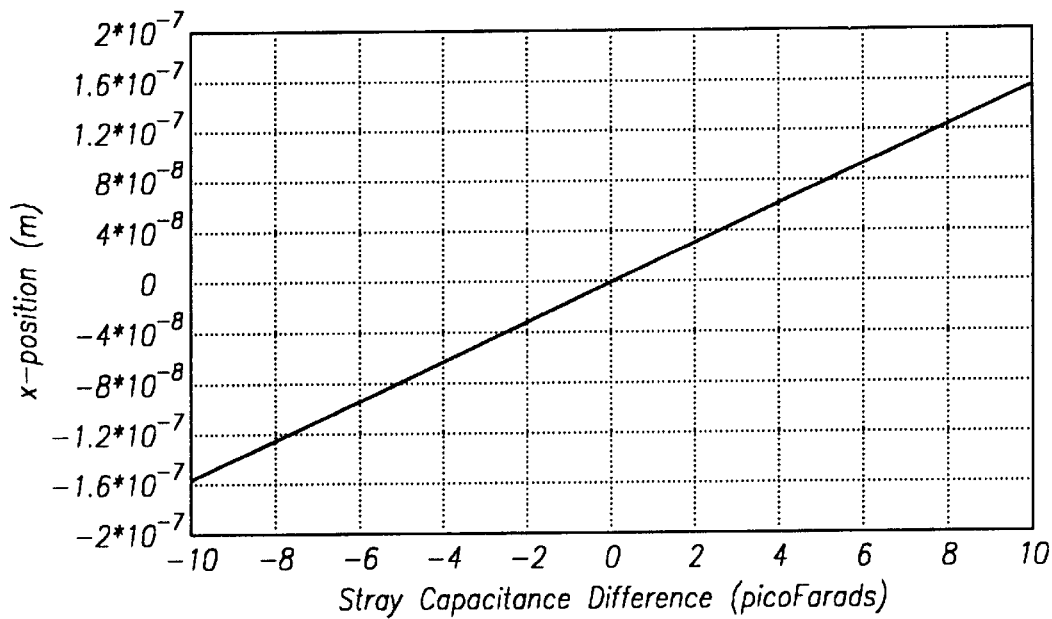
FIG. 11 is a graph of a change in steady-state mass position from its center position between top and bottom plates as a function of difference in stray capacitance.

Solving for the mass position which satisfies Equation 10 gives $$y(0) = -\frac{\left(\varepsilon \cdot \frac{A}{d1} - \varepsilon \cdot \frac{A}{d2} + C1s + C1a - C2a - C2s\right)}{\left(\varepsilon \cdot \frac{A}{d2^2} + \varepsilon \cdot \frac{A}{d1^2}\right)} \quad (11)$$

which is plotted in FIG. 11 as a function of the difference in the stray capacitance (C2s−C1s) and with C1a=C2a=0. A stray capacitance mismatch will result in an offset in the proof mass position away from the mechanical center (the position exactly between the top and bottom plates).

During operation of the feedback loop where external acceleration or force on the mass is zero (that is, except gravity force), the forces on the mass should balance, that is, $$F1 + F2 + Fg = 0 \quad (12)$$

where

F1=total electrostatic force due to the voltage between plate 14 and the center mass 16, F2=total electrostatic force due to the voltage between plate 12 and the center mass 16, and Fg=force on the mass due to gravity.

In calibration phase 1, the voltage, Vd, required to cancel an input static acceleration due to gravity is given by the solution to the following electrostatic forcing equation:

$$\frac{D1g}{2} \cdot \left[\frac{C10(Vref - Vd)^2}{d1 \cdot \left(1 - \frac{x0}{d1}\right)^2} - \frac{C20(Vref - Vd)^2}{d2 \cdot \left(1 - \frac{x0}{d2}\right)^2}\right] - 9.8 \cdot m \cdot \cos(\phi) = 0 \quad (13)$$

where

D1g=duty factor of the static 1-g cancellation forcing phase,

C10=nominal plate 14 capacitance,

C20=nominal plate 12 capacitance,
Vref=reference voltage,
m=mass
φ=sensor orientation with respect to the center of the earth.

Let Vd1 equal the value of Vd that solves Equation 13. This is the steady-state loop output voltage in phase 1 and after analog-to-digital conversion is referred to as Vdac1.

Figure 12:
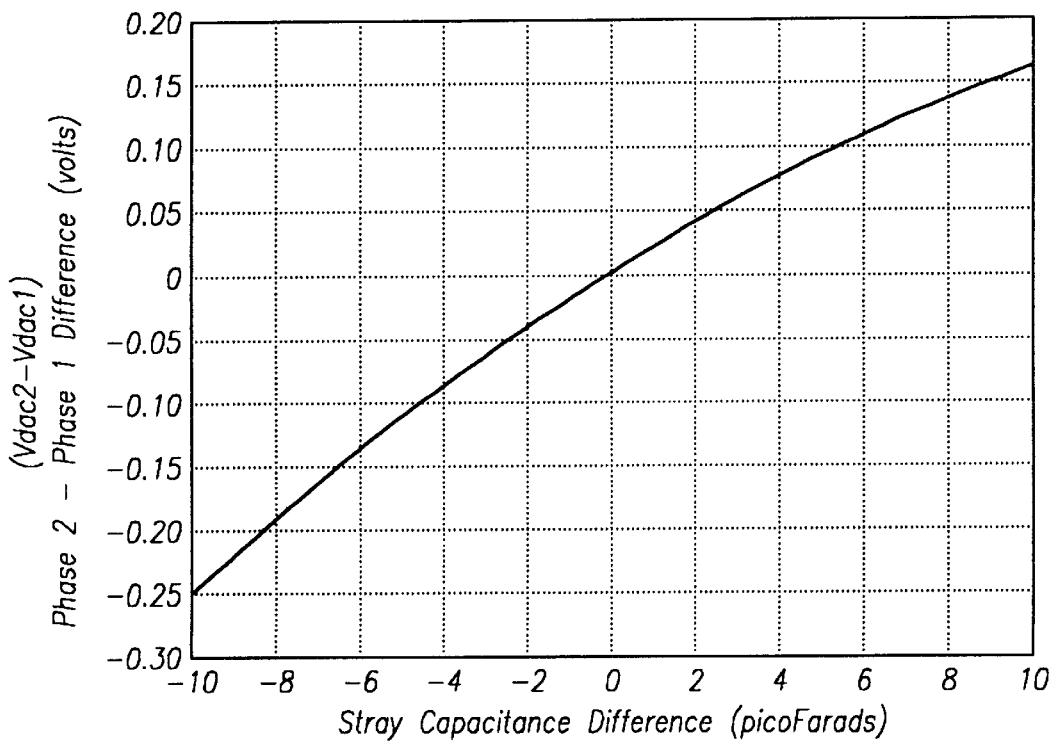
FIG. 12 is a graph similar to that of FIG. 11 but plots the difference between measured voltages in calibration phase 1 and calibration phase 2 as a function of difference in stray capacitance.

In calibration phase 2, this voltage is given by the solution to the following equation:

$$\frac{D1g + Du}{2} \cdot \left[\frac{C10(Vref - Vd)^2}{d1 \cdot \left(1 - \frac{x0}{d1}\right)^2} - \frac{C20(Vref - Vd)^2}{d2 \cdot \left(1 - \frac{x0}{d2}\right)^2}\right] + \quad (14)$$

$$\frac{Dd}{2} \cdot \left[\frac{C10(Vref - Vd)^2}{d1 \cdot \left(1 - \frac{x0}{d1}\right)^2} - \frac{C20(Vref - Vd)^2}{d2 \cdot \left(1 - \frac{x0}{d2}\right)^2}\right] - 9 \cdot 8 \cdot m \cdot \cos(\phi)$$

where
Du=duty factor of the dummy up forcing phase,
Dd=duty factor of the dummy down forcing phase Let Vd2 equal the value of Vd that solves Equation 14. This is the steady-state loop output voltage in phase 2 and after analog-to-digital conversion will be referred to as Vdac2. The difference, Vdac2–Vdac1, is plotted as a function of the stray capacitance difference, C2s–C1s, in FIG. 12.

When the stray capacitance difference is zero (balanced stray capacitance), Vdac2 is equal to Vdac1. Consequently, if the adjustable stray array can be set such that steady-state loop voltage in phase 1 is equal to the steady-state loop voltage in phase 2, then the total plate 1 capacitance will equal the total plate 2 capacitance, and the sensor is stray capacitance calibrated.

Apparatus For Stray Capacitance Calibration

Figure 13:
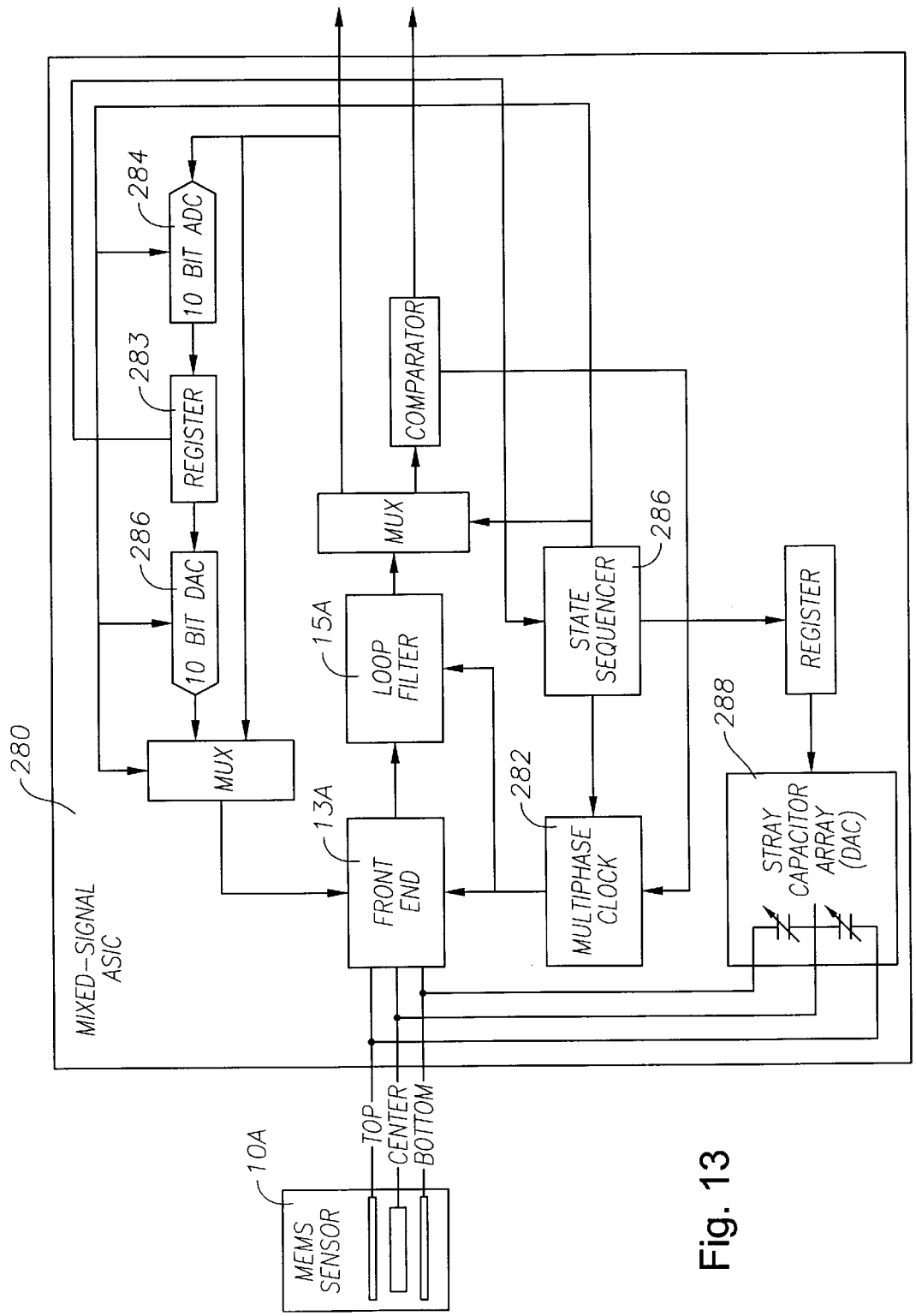
FIG. 13 is a block diagram of an ASIC coupled to the MEMS SENSOR for measuring the difference in stray capacitance between the center mass and top and bottom plates and for adjusting such stray capacitance to null the difference between such capacitance.

A block diagram of an ASIC and MEMS sensor is shown in FIG. 13. The MEMS sensor 10A connects to a mixed-signal, Application Specific IC or ASIC 280 which, in normal operation, converts the dynamic incident acceleration into a digital, sigma-delta modulated (ΣΔ) bitstream. The components of the ASIC 280 that are relevant to the stray capacitance calibration are described below.

Front End 13A

The front-end 13A provides the interface to the sensor 10A for both electrostatic forcing and position sensing. The input to the front-end are the clock signals from multiphase clock 282 controlling the switching during the forcing and sensing phases, and in the stray calibration phases, the analog voltage feedback signal. The output of the front-end 10A is an analog voltage signal proportional to the imbalance in top and bottom capacitance.

Loop Filter 15A

The loop filter 15A is a switched-capacitor (SC) circuit used for noise shaping when the device is in normal operating mode, (i.e., ΣΔ digital output) and as a feedback compensator when in the stray calibration modes. The inputs to the loop filter 15A are the voltage output from the front-end 13A and the clock signals from multiphase clock 282 which control the switches. The output from the loop filter 15A is the (sampled) feedback voltage.

Analog to Digital Converter/Digital To Analog Converter

The analog-to-digital converter (ADC) 284 is used to digitize the analog voltage feedback signals during the stray calibration phases. These digitized values are registered in register 283 and used by the state sequencer 286 in a successive approximation (SAR) algorithm. The DAC 286 provides a forcing voltage during ΣΔ operation which cancels the local static acceleration. The ADC 284 and DAC 286 have 10-bit resolution. This is the minimum number of bits required to calibrate the stray capacitance to within 0.3125 pico Farads.

State Sequencer

The state sequencer 286 provides control of the stray calibration phases including the SAR algorithm. The inputs to the state sequencer 286 are the digitized feedback voltages from register 283 at the end of the two stray calibration phases. The difference in these values is used by the state sequencer in the SAR algorithm to compute the stray calibration values.

Stray Capacitor Array 288

The stray capacitance is adjusted via an array of capacitors 288 which function as a Digital-To-Analog Converter. The array adds or subtracts discrete quantities of capacitance between the top and center plates, and bottom and center plates of the MEMS sensor 10A. The stray DAC has 6 bits of resolution which yields a 0.3125 pico Farad LSB. This is the resolution required to calibrate the stray capacitance such that all performance requirements are met.

Multiphase Clock 282

All clock signals on the ASIC 280 originate at the multiphase clock generator 282. During ΣΔ operation, the polarity of the loop filter 15A output voltage is used to determine the direction of the forcing on the sensor which is actualized by the clock signals sent to the front-end.

Stray Calibration Clock Timing Phases

Figure 14:
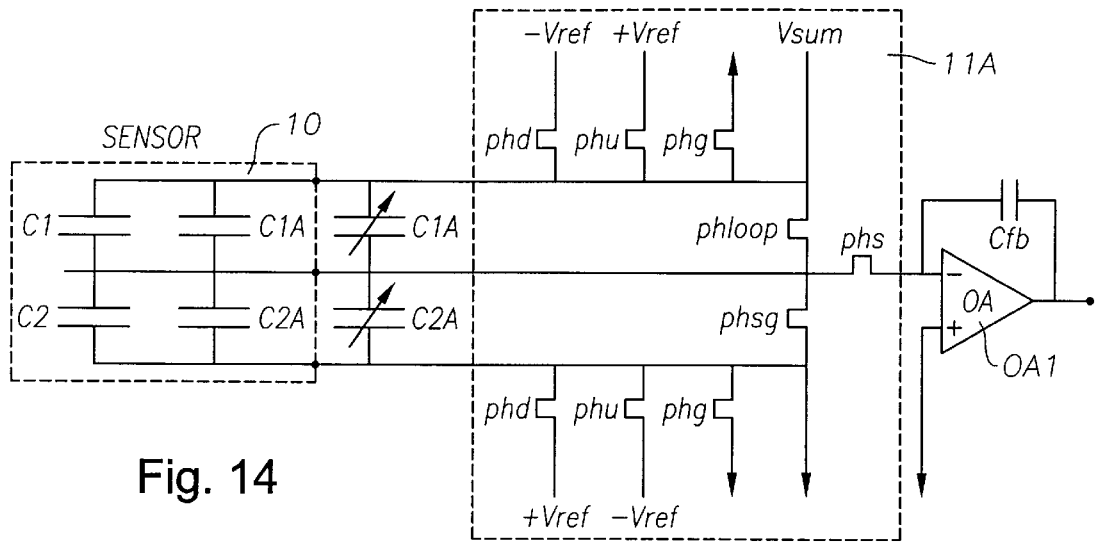
FIG. 14 is a switching schematic for connecting the sensor to an operational amplifier in the front end of the ASIC for producing various functional phases of the calibration phase 1 and the calibration phase 2 as shown in FIG. 10.

The front-end switching circuit 11A, shown in FIG. 14 interfaces the transducer 10 to the ASIC 280, applies force to the sensor, senses the x-position of the sensor mass via changes in the sensor capacitance, and outputs an analog voltage representation of the x displacement in a sampled fashion. The two phases required for stray calibration are described below. The clock signal names refer the front-end diagram shown in FIG. 14.

Calibration Phase 1 (no dummy force)

Figure 15:
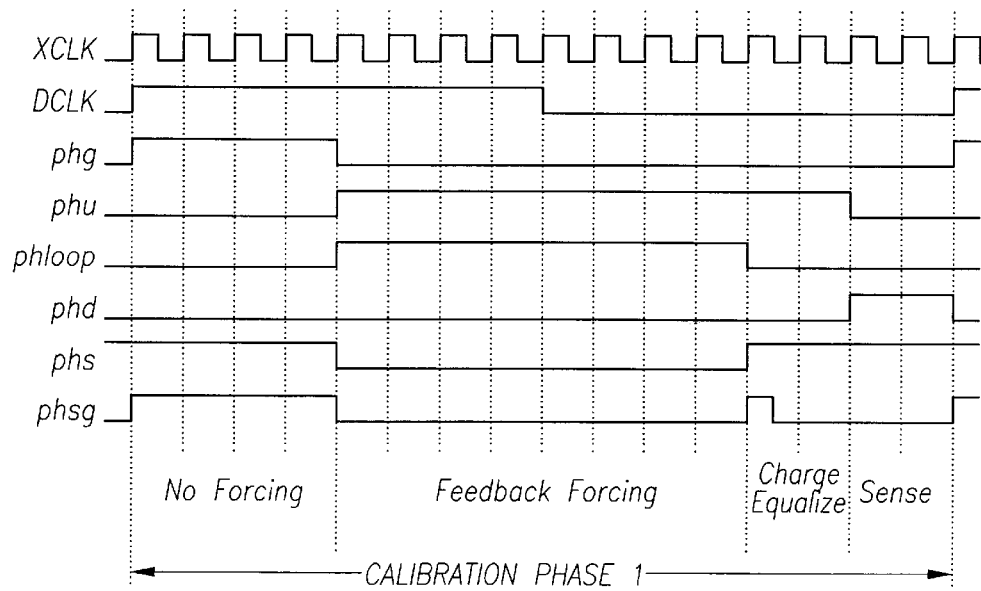
FIG. 15 is a timing diagram showing the condition of the switches of FIG. 14 during calibration phase 1.
Figure 16:
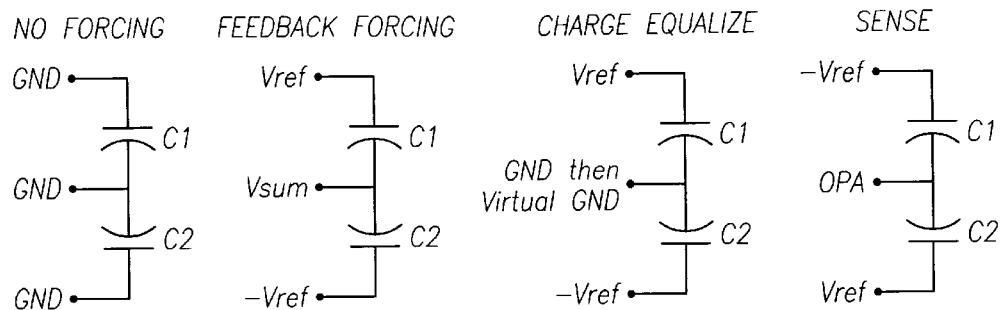
FIG. 16 shows the electrical model of the capacitors and reference voltages and ground during the calibration phase 1 intervals of FIG. 15.

Calibration phase 1 timing is shown in FIG. 15 (see also FIG. 10). During the first four XCLK cycles, no force is applied to the sensor. During the next eight XCLK cycles the loop's feedback voltage is used to force the sensor and compensate for any static input accelerations. The next four XCLK phases are used to equalize the charge on the sensor plates and to sense the difference in capacitance and thus the position of the mass between the plates. The sensor forcing configurations for calibration phase 1 are shown in FIG. 16.

During the NO FORCING phase, no force is applied during these four clock intervals. During FEEDBACK FORCING phase (STATIC CANCELLATION), $V_{REF}$ is applied to the top plate, $-V_{REF}$ is applied to the bottom plate, and $V_{SUM}$ is applied to the center plate. During the CHARGE EQUALIZE phase, $V_{REF}$ is applied to the top plate, $-V_{REF}$ to the bottom plate. The center plate is grounded for a half cycle of a clock interval and then connected to op-amp OA1 virtual ground for one and a half intervals. During the SENSE phase, $-V_{REF}$ is applied to the top plate, $V_{REF}$ to the bottom plate, and the center plate is connected to the inverting terminal of the op-amp OA1.

These phases are applied in sequence until it can be determined that the sensor has stabilized to its nominal position. The output of the loop filter 15A is then measured to determine the static acceleration cancellation voltage. (This voltage is referred to as $V_{DAC1}$, since a DAC is used to convert this voltage and use it in the calibration procedure).

Calibration Phase 2 (dummy forces applied)

Figure 17:
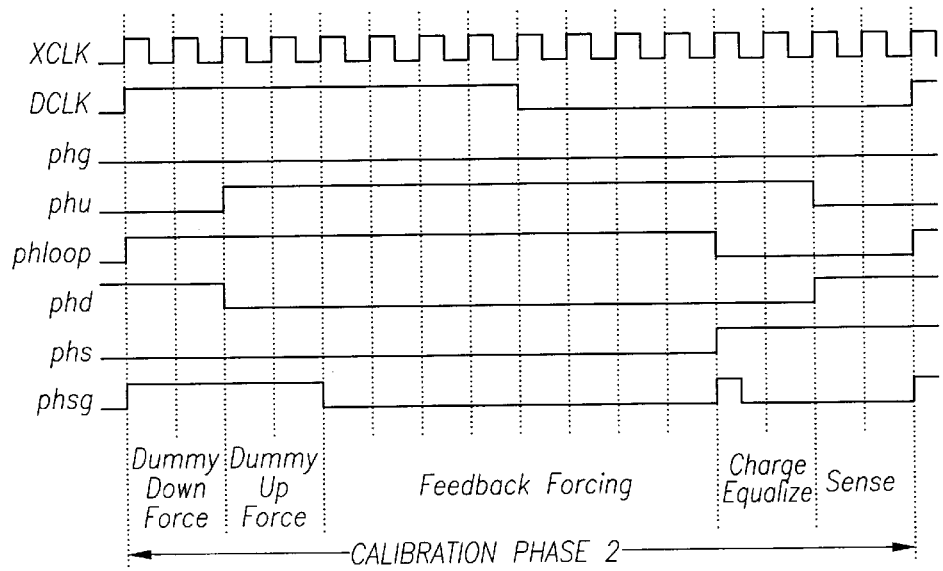
FIG. 17 is a timing diagram showing the condition of switches of FIG. 14 during calibration phase 2.
Figure 18:
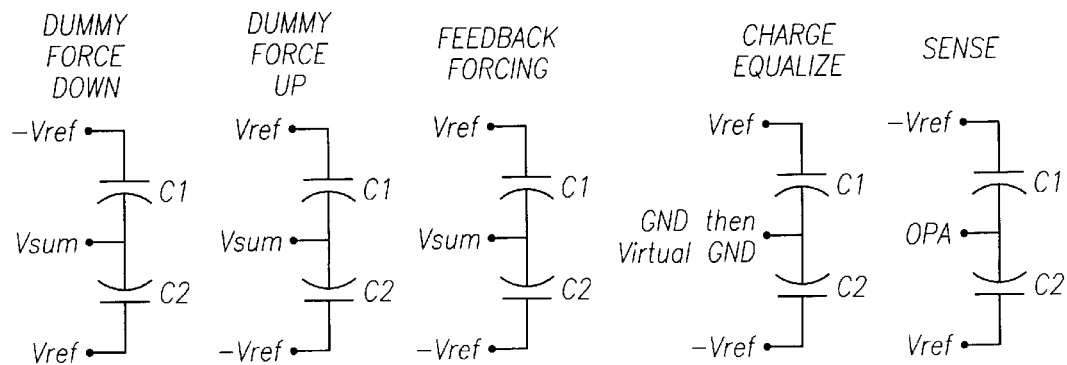
FIG. 18 shows the electrical model of the capacitors and reference voltages and ground during the calibration phase 2 intervals of FIG. 17.

Calibration phase 2 timing is shown in FIG. 17. Phase 2 is identical to Phase 1 except that a dummy force down and dummy force up are used. If the stray capacitance is mismatched, then for a given feedback voltage, $V_{SUM}$, the net forcing on the sensor is different in phase 2 than in phase 1. Consequently, the final steady-state value of $V_{SUM}$ required to cancel the static acceleration will be different than in phase 1. The sensor forcing configurations for calibration phase 2 are shown in FIG. 18.

During the DUMMY DOWN FORCING phase, $-V_{REF}$ is applied to the top plate, $V_{REF}$ is applied to the bottom plate, and $V_{SUM}$ is applied to the center plate. During the DUMMY UP FORCING phase, $V_{REF}$ is applied to the top plate, $-V_{REF}$ is applied to the bottom plate, and $V_{SUM}$ is applied to the center plate. During the FEEDBACK FORCING or STATIC CANCELLATION phase, $V_{REF}$ is applied to the top plate, $-V_{REF}$ to the bottom plate, and $V_{SUM}$ to the center plate. During the CHARGE EQUALIZE phase, $V_{REF}$ is applied to the top plate, and $-V_{REF}$ is applied to the bottom plate. The center plate is grounded for a half cycle of a clock interval (XCLK), and then connected to op-amp OA1 virtual ground for one and a half cycles. During the SENSE phase, $-V_{REF}$ is applied to the top plate, $V_{REF}$ to the bottom plate, and the center plate is connected to the inverting terminal of the sense amplifier.

These phases are applied in sequence in Calibration Phase 2 until it can be determined that the sensor 10A has stabilized to its nominal position. The output of the loop filter 15A is then measured to determine the static acceleration cancellation voltage. (This voltage is referred to as $V_{DAC2}$, because a DAC is used to recreate this voltage during normal operation.) Next, $V_{DAC2}$ is compared to $V_{DAC1}$ which is measured at the end of phase 1. If the values are not identical (within the resolution of the ADCs), then the stray capacitance is adjusted via the stray capacitance array of stray capacitance array (DAC) 288. Calibration phase 1 and phase 2 are repeated in a SAR algorithm until the stray capacitances are matched (within the resolution of the stray capacitance DAC).

Stray Calibration Sequencing

Figure 19:
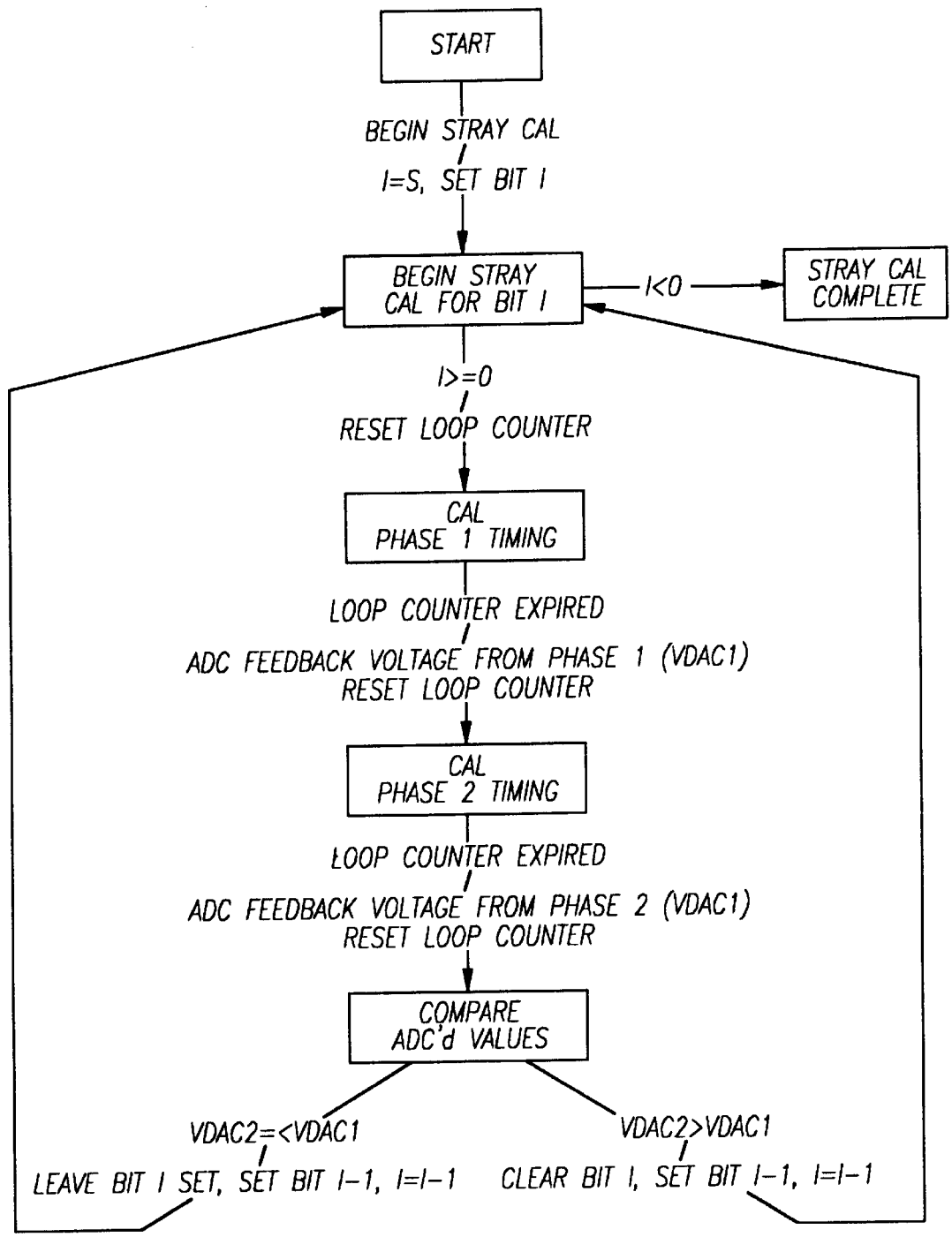
FIG. 19 shows a logic flow diagram of a finite state machine which controls the stray calibration method to determine values of bits of a stray capacitor DAC to balance stray capacitance between the mass and top and bottom plates of the sensor.

The stray calibration procedure under control of state sequencer 286 (FIG. 13) is performed by the finite state machine (FSM) shown in FIG. 19. The FSM implements a SAR algorithm to determine the proper values for the 6 bits in the stray capacitor DAC 288 (See FIG. 13). Starting at the most significant bit (MSB) of the stray DAC, the following steps are performed:

(1) The current bit is set in the stray capacitor array (DAC) 288;

(2) Phase 1 timing is run for a designated number of cycles to allow a steady-state value to develop for the loop feedback voltage;

(3) The loop voltage is connected to a 10 bit digital value in ADC 284 and its value stored in register 283;

(4) Phase 2 timing is run for a designated number of cycles to allow a steady-state value to develop for the loop feedback voltage;

(5) The loop voltage is converted to a 10 bit digital value in ADC 284 and its value stored in register 288;

(6) The digitized loop voltages of phase 1 and phase 2 (steps 3 and 5 above) are compared and the current bit is cleared if the ADC value for phase 2 is greater than the ADC value for phase 1; and (7) the next most significant bit is set.

This procedure is repeated bit by bit, for all the remaining bits. At the end of the Successive AppRoximation (SAR) procedure, the stray DAC value will be that required to maintain equal feedback voltages in phase 1 and phase 2. This is a sufficient condition for insuring that the total capacitance, including strays, on the top and bottom plates are balanced.

The present invention and the best modes of practicing it have been described. It is to be understood that the foregoing descriptions are illustrative only and that other means and techniques can be employed without departing from the full scope of the invention as described in the appended claims.

What is claimed is:

1. In a closed loop transducer having a micro-machined sensing element which moves between top and bottom plates and the position of said element is sensed by changes in capacitance between the top and bottom plates in response to an external force by an integrated circuit which measures the position of said sensing element and provides a feedback force to said sensor to center it between said top and bottom plates, apparatus for calibrating stray capacitance between said sensing element and said top and bottom plates comprising, means for determining a stray capacitance parameter that is representative of the difference of stray capacitance between the sensing element and the top plate and stray capacitance between the sensing element and the bottom plate, and means for applying calibrating capacitance across said sensing element and said top plate or across said sensing element and said bottom plate, where said calibrating capacitance is proportional to said stray capacitance parameter.

2. The apparatus of claim 1 wherein, said apparatus comprises electrical circuits designed on an ASIC of said closed loop transducer.

3. The apparatus of claim 1 wherein said means for determining a stray capacitance parameter includes, means for determining a steady-state feedback voltage in a first calibration phase to produce a voltage $V_{F1}$;

means for determining a steady-state feedback voltage in a second calibration phase to produce a voltage $V_{F2}$; and means for determining a difference between said voltage $V_{F1}$ and said voltage $V_{F2}$ to produce said stray capacitance parameter.

4. The apparatus of claim 3 wherein, said first calibration phase does not include a dummy force, and said second calibration phase does include dummy forces.

5. The apparatus of claim 3 wherein, said means for applying calibrating capacitance is a stray capacitor array for adding or subtracting discrete quantities of capacitance between said sensing element and said top plate or said bottom plate.

6. The apparatus of claim 5 wherein, said voltage $V_{F1}$ and said voltage $V_{F2}$ are converted to a digital number representative of analog signals, said stray capacitance parameter is a digital number representative of said difference between $V_{F1}$ and $V_{F2}$, and said stray capacitor array responds to said digital stray capacitance parameter with said discrete quantities of capacitance 7.

7. In a closed loop transducer having a micro-machined sensing element which moves between top and bottom plates and the position of said element is sensed by changes in capacitance between the top and bottom plates in response to an external force by an integrated circuit which measures the position of said sensing element and provides a feedback force to said sensor to center it between said top and bottom plates, a method for calibrating stray capacitance between said sensing element and said top and bottom plates comprising the steps of, determining a stray capacitance parameter that is representative of the difference of stray capacitance between the sensing element and the top plate and stray capacitance between the sensing element and the bottom plate, and applying calibrating capacitance across said sensing element and said top plate or across said sensing element and said bottom plate, where said calibrating capacitance is proportional to said stray capacitance parameter.

8. The method of claim 7 wherein said determining step includes the sub steps of, determining a steady-state feedback voltage in a first calibration phase to produce a voltage $V_{F1}$;

determining a steady-state feedback voltage in a second calibration phase to produce a voltage $F_{F2}$; and determining a difference between said voltage $V_{F1}$ and said voltage $V_{F2}$ to produce said stray capacitance parameter.

9. The method of claim 8 wherein, said first calibration phase does not include a dummy force, and said second calibration phase does include dummy forces.

10. The method of claim 8 wherein said applying step includes the step of applying said stray capacitance parameter to a stray capacitor array, and adding or subtracting discrete quantities of capacitance between said sensing element and said top plate or said bottom plate in response to said stray capacitance parameters.

11. The method of claim 10 including the substeps of converting said voltages $V_{F1}$ and $V_{F2}$ to digital numbers representative of analog signals, determining said stray capacitance parameter as a digital number representative of said difference between $V_{F1}$ and $V_{F2}$, and applying discrete quantities of capacitance from a stray capacitance array across said sensing element and said top plate or across said sensing element and said bottom plate in response to said digital number representative of said stray capacitance parameter.

12. The method of claim 7 wherein said determining step includes the sub steps of, (a) determining a steady-state feedback voltage in a first calibration phase to develop a first loop feedback voltage, where said first calibration phase does not include dummy forces;

(b) applying said first loop feedback voltage to an ADC and storing a digital value thereof;

(c) determining a steady-state feedback voltage in a second calibration phase to develop a second loop feedback voltage, where said second calibration phase includes dummy forces;

(d) applying said second loop feedback voltage to an ADC and storing a digital value thereof;

(e) comparing said digital value of said first loop feedback voltage with said second loop feedback voltage to obtain a difference voltage, (f) applying capacitance between said sensing element and said top plate or between said sensing element and said bottom plate in response to said difference voltage, and (g) repeating said steps (a) through (e) until said difference voltage is zero.

* * * * *